UNITED STATES PATENT OFFICE.

IVAN LEVINSTEIN, OF MANCHESTER, ENGLAND, ASSIGNOR TO COMPANY OF LEVIN-STEIN LIMITED, OF MANCHESTER, ENGLAND.

PRODUCTION AND UTILIZATION OF SULFONATED STEARIC PRODUCTS.

1,176,378. Specification of Letters Patent. Patented Mar. 21, 1916.

No Drawing. Application filed February 17, 1914. Serial No. 819,169.

*To all whom it may concern:*

Be it known that I, IVAN LEVINSTEIN, a subject of the King of Great Britain and Ireland, and a resident of Manchester, in the county of Lancaster, England, have invented new and useful Improvements in and Relating to the Production and Utilization of Sulfonated Stearic Products, of which the following is a specification.

Lewkovitch, *Chemical Technology of Oils, Fats and Waxes*, vol. 3, page 181, (1909 edition) refers to sulfonated compounds of fats, but the method given is not a practicable one for the sulfonation of fats, nor was it intended to be. He states on the same page "that the behavior of the sulfuric acid to the stearic glycerids is of little practical importance since any sulfonated compounds that are formed are subsequently decomposed, yielding the original stearic acid practically unchanged." In confirmation of this quotation from Lewkovitch, a large number of experiments I have made have shown that pure stearic acid does not yield stearic sulfo compounds, at least not by any hitherto known method of sulfonating oils. In my experiments I have not only applied the usual methods but have varied the procedure with regard to temperature, strength of sulfuric acid, duration of reaction and the like, but I have always obtained negative results, that is the stearic acid has remained unchanged. I have found however that stearic acid which has been combined with or mixed with a fat, oil, or the like capable of forming sulfonated compounds will, when treated in such mixture or compound in the manner hereinafter described, yield stearic sulfo acids. The concurrent production of the sulfo compounds of the stearic acid and of the fat, oil, grease or the like which is combined or mixed with the stearic acid renders the sulfo stearic compound a permanent one which may be used in the treatment of leather during its preparation, and also in the finishing of textile material.

That the sulfo-compounds produced according to this invention do contain sulfo stearic acid may be assumed by the following facts. Stearic acid is not soluble or miscible in water. Certain sulfonated fatty acids are soluble or miscible in water and possess the remarkable property of forming compounds with fats, semi-fats, greases or waxes which compounds are soluble or emulsifiable or miscible in or with water. See for example my prior British patent specification No. 18333 of 1912. The sulfonated compounds produced according to this invention possess this same remarkable property of rendering fats, waxes or the like soluble or miscible or emulsifiable even when the fat or oil which is concurrently sulfonated with the stearic acid yields sulfo compounds which will not render the fats, waxes, or the like soluble or miscible in water. The property, then, which compounds produced according to this invention do possess of rendering fats, waxes, or the like permanently soluble or miscible must reside in the sulfo stearic acid produced.

This invention consists (a) in sulfonating the stearic acid concurrently with a suitable fat, oil or the like and (b) in the production of miscible soluble or emulsifiable compounds of the joint sulfonated products and greases, fats, waxes or the like.

A generally convenient mode of operation to produce the desired permanent sulfo stearic acid is to melt the substance which contains the stearic acid, and then to cool it down until it is about 5° C. lower in temperature than the temperature at which the sulfonation is to be carried out. Then add gradually sulfuric acid (for preference 100% $H_2SO_4$ monohydrate) and continue at the stated temperature until sulfonation is complete, that is until a sample taken from the sulfonation melt is miscible with hot water. Then pour, under constant agitation, the sulfonation melt into a 10% salt solution which has previously been heated to 30-35° C. Stop agitation and allow the mass to settle, keeping the temperature of the salt solution between 30-35° C., and as soon as the oil or grease or fat has separated run off the warm salt solution. The oil or fat remaining is then melted up again and allowed to settle to further remove mineral acid, or the latter may be neutralized or partially neutralized with an alkali. The resulting sulfonation compound, if the mineral acid has all been removed, is the free sulfo acid which is of a suitable character. Care has to be taken that the finishing process is carried out as quickly as possible as these compounds are very liable to hydrolize during this stage.

The following are examples of substances, proportions, temperatures and the like employed in carrying this invention into effect.

Example 1: 200 parts of commercial stearin (melting point 45° C.) are melted and then cooled to 40° C. stirring all the while. Commercial stearin contains a considerable portion of free fat and the use of this product may be regarded equivalent to the use of stearin itself with a fat added thereto. 50 parts of sulfuric acid monohydrate are slowly added and the temperature kept between 45° and 50° C. until a sample of the melt is miscible in hot water. The finishing process is as stated above.

Example 2: 200 parts of pure stearic acid are melted together with 200 parts of distilled wool stearin, cooled to about 40° C. and sulfonated as above described at a temperature of from 40° to 50° C.

Example 3: 200 parts of pure stearic acid are melted with 200 parts of wool grease. The method is the same as that given in Example 1 except that during sulfonation the temperature is kept between 35° and 40° C. Wool stearin is a waxy substance consisting mainly of cholesterols obtained from the wool greases of commerce. It is frequently referred to as "anhydrous lanolin" or as "wool wax" or "wool fat." The wool grease, referred to in Example 3, is, however, the material from which the cholesterols are derived and contains the cholesterols and the waste products consisting of sudorific acid, potash, etc.

Example 4: 200 parts of commercial stearin are melted with 200 parts of maize oil. Temperature of sulfonation 35–40° C.

Example 5: 200 parts of commercial stearin are melted with 200 parts of castor oil. Temperature of sulfonation 40° to 45° C.

Example 6: 200 parts of commercial stearin are melted with 200 parts of tallow. Temperature of sulfonation 40° C.

Example 7: 200 parts of distilled wool stearin are melted with 200 parts of wool grease. Temperature of sulfonation 35 to 40° C.

Example 8: Equal parts of commercial stearin and palm oil are melted together and cooled to 40° C. To 200 parts of this mixture 50° parts of 100% $H_2SO_4$ are gradually added. Sulfonation temperature 40 to 45° C.

Example 9: Equal parts of commercial stearin and Japan wax are melted together and cooled to 35° C. Sulfonated as in preceding example but at a temperature of 35° C.

The sulfo compounds of stearic acid produced as above described may be melted and mixed with other fats, oils, waxes such as paraffin wax, or greases such as tallow, to render such fats, oils, or the like soluble or emulsifiable in or miscible with water.

In the above examples the stearic acid or the source of stearic acid has only been described as being melted and mixed with a single oil, fat or the like for sulfonation, but if desired it may be melted and mixed with two or more oils or the like for sulfonation.

In the claims the generic term fat will be used and intended to cover either a solid fat, fatty oil, grease or the like, which is concurrently treated with sulfuric acid with the stearic acid, or is thereafter mixed with the sulfonated compound thus formed to provide the miscible compound which forms the desired product; and it is intended also that the term miscible be sufficiently broad to cover any miscible, soluble or emulsifiable compound of the character described; the term wax as hereinafter used, is regarded sufficiently broad to cover such compounds as are generally covered by this term in the standard authorities.

What I claim is:—

1. The production of a permanent sulfo stearic compound by concurrently treating with sulfuric acid, stearic acid and a fat capable of forming a sulfo compound, substantially as hereinbefore described.

2. A sulfonated compound containing a permanent sulfo stearic compound and a sulfo compound of a fat, substantially as described.

3. The production of a miscible compound of a fat or wax by admixture of the fat or wax with a sulfonated compound containing a permanent sulfo stearic compound and a sulfo compound of a fat, substantially as set forth.

4. A miscible compound containing a fat or wax, a sulfo compound of stearic acid and a sulfo compound of a fat, substantially as set forth.

In witness whereof I have hereunto set my hand in the presence of two subscribing witnesses.

IVAN LEVINSTEIN.

Witnesses:
  WILLIAM GEO. HEYL,
  GEORGE WEAVER.